July 10, 1956  A. H. KING  2,754,163
BEARING AND SHAFT COUPLING DEVICE
Filed May 25, 1954
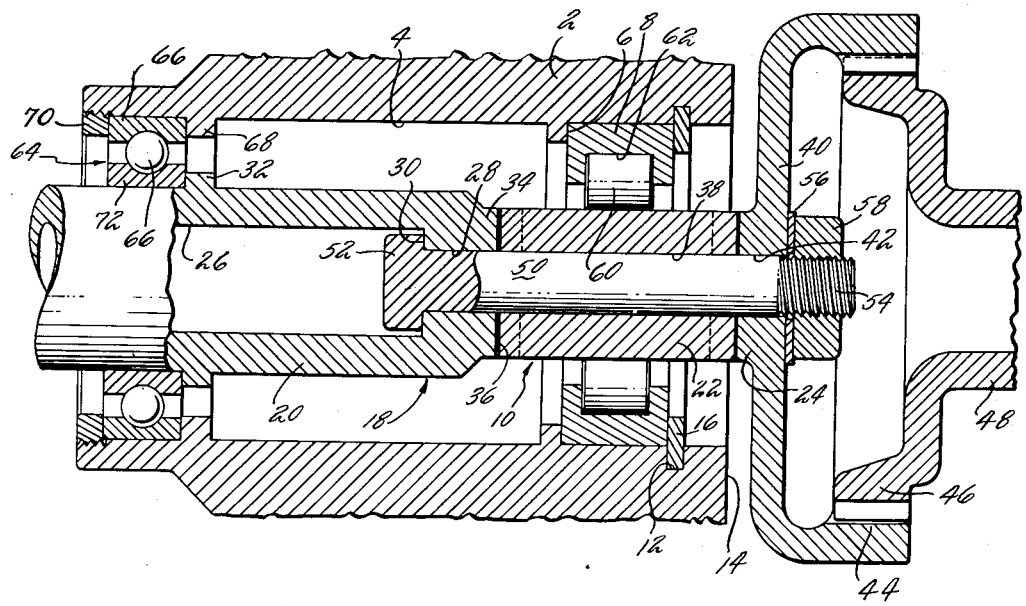
INVENTOR
ALEXANDER H. KING
BY Jack M. McCarthy
AGENT

United States Patent Office 2,754,163
Patented July 10, 1956

2,754,163

BEARING AND SHAFT COUPLING DEVICE

Alexander H. King, West Hartford, Conn., assignor to United Aircraft Corporation, East Hartford, Conn., a corporation of Delaware Application May 25, 1954, Serial No. 432,280

5 Claims. (Cl. 308—207)

This invention relates to a bearing and shaft coupling device.

An object of this invention is to provide a bearing which utilizes a replaceable shaft portion as the inner race of the bearing.

Another object of this invention is to use all of the diameter of the inner race of a bearing in torque carrying capacity. This allows the use of a smaller diameter opening for a shaft having a given torque capacity.

A further object of this invention is to provide a bearing for high speed operation in which the opening for supporting said bearing is limited in size.

Further objects and advantages will be apparent from the following specification and drawings.

The figure is a view in section showing a sectional shaft incorporating the invention mounted for rotation in a bearing. The housing 2 has a bore 4 positioned therein. A flange 6 is fixedly mounted to said housing and projects inwardly from bore 4. This flange 6 serves as a positioning and retaining member for an outer bearing ring 8 of a bearing 10. An annular groove 12 is formed in the bore 4 of the housing between the flange 6 and outer edge 14 of the housing. A snap ring 16 is positioned in groove 14 to provide the other positioning and retaining flange for outer bearing ring 8. A sectional shaft 18 extends from within the housing to its exterior through bore 4 and outer bearing ring 8.

This sectional shaft shown is formed from four main members: (1) a shaft 20, (2) a shaft member or inner bearing ring 22, (3) a short shaft 24 and (4) means for holding said first three parts together. Shaft section 20 is formed as a hollow shaft having a bore 26 extending from one end to a point near the end adjacent inner bearing ring 22. At this point the bore is necked down to a smaller diameter as at 28. An annular abutment 30 is formed where bore 26 and bore 28 intersect. A flange 32 is fixedly mounted around the outer circumference of shaft section 20 for a purpose to be hereinafter described. The free end 34 of said shaft section has face splines 36 thereon.

Inner bearing ring member 22 extends from one side of outer bearing ring 8 to the other and has a bore 38 located therethrough. This shaft section has face splines located on both ends. Shaft section 24 is formed having face splines on the end adjacent inner bearing ring 22 and a flange 40 at the other end. A bore 42 passes from one end to the other. An annular ring gear 44 is fixed to the outer edge of flange 40. A sun gear 46 meshes with ring gear 44 to transmit movement from shaft section 24 to shaft 48 which is fixed to sun gear 46.

Bores 28, 38 and 42 of shaft 20, inner bearing ring 22 and shaft 24, respectively, are all of the same diameter. A bolt 50 extends through said bores with a head 52 thereon engaging annular abutment 30. A threaded end 54 extends through shaft section 24 and has a washer 56 placed thereon and a nut 58 threadably mounted thereon. Rollers 60 are mounted in a race 62 in outer bearing ring 8 between said ring and inner bearing ring 22.

Shaft section 20 is also supported for rotation and thrust movement in a bearing assembly 64. The outer ring 66 of bearing 64 is fixedly mounted between a flange 68 extending inwardly from bore 4 of the housing and a nut 70 threadably mounted in the end of bore 4. The inner ring 72 of bearing 64 is positioned around shaft section 20. Flange 32 on shaft section 20 provides means for regulating the axial movement of shaft section 20.

I claim:

1. In combination, a housing, said housing having an opening, an outer bearing ring mounted in said opening, an inner bearing ring mounted within said outer bearing ring, said outer bearing ring having a race on its inner periphery, a plurality of bearing elements located around said inner bearing and in said race on said outer bearing ring, both annular ends of said inner bearing ring having a plurality of face splines thereon, a shaft having one end with a face having splines thereon which cooperates with the splines on one end of said inner bearing ring, said shaft having a bolt extending from said face on said shaft, said bolt being dimensioned so that it has a slideable fit within said inner bearing ring, a second shaft having one end with a face having splines thereon which cooperate with the splines on the other end of said inner bearing ring, said shaft having a hole therethrough, said hole being of such a size that the bolt projects therethrough, means fixedly attached to the free end of said bolt to hold said splines of said first shaft in engagement with the cooperating splines of the inner bearing ring and to hold said splines of said second shaft in engagement with the cooperating splines of the inner bearing ring.

2. In combination, a housing, said housing having an opening, an outer bearing ring mounted in said opening, an inner bearing ring mounted within said outer bearing ring, said outer bearing ring having a race on its inner periphery, a plurality of bearing elements located around said inner bearing and in said race on said outer bearing ring, both annular ends of said inner bearing ring having a plurality of face splines thereon, a shaft having one end with a face having splines thereon which cooperates with the splines on one end of said inner bearing ring, said shaft having a removable bolt extending from said face on said shaft, said bolt being dimensioned so that it has a slideable fit within said inner bearing ring, a second shaft having one end with a face having splines thereon which cooperate with the splines on the other end of said inner bearing ring, said shaft having a hole therethrough, said hole being of such a size that the bolt projects therethrough, means fixedly attached to the free end of said bolt to hold said splines of said first shaft in engagement with the cooperating splines of the inner bearing ring and to hold said splines of said second shaft in engagement with the cooperating splines of the inner bearing ring.

3. In combination, a housing, said housing having an opening, an outer bearing ring mounted in said opening, an inner bearing ring mounted within said outer bearing ring, said outer bearing ring having a race on its inner periphery, a plurality of bearing elements located around said inner bearing and in said race on said outer bearing ring, both annular ends of said inner bearing ring having a plurality of face splines thereon, a shaft having one end with a face having splines thereon which cooperate with the splines on one end of said inner bearing ring, said shaft having a bore in the end thereof, a bolt extending from said bore in the face on said shaft, said bolt being dimensioned so that it fits within said inner bearing ring, a second shaft having one end with a face having splines thereon which cooperate with the splines on the other end of said inner bearing ring, said shaft having a hole therethrough, said hole being of such a size that the bolt projects therethrough, means fixedly attached to the free end of said bolt to hold said splines of said first shaft in engagement with the cooperating splines of the inner bearing ring and to hold said splines of said second shaft in engagement with the cooperating splines of the inner bearing ring.

4. In combination, a housing, said housing having an opening, an outer bearing ring mounted in said opening, an inner bearing ring mounted within said outer bearing ring, said outer bearing ring having a race on its inner periphery, a plurality of bearing elements located around said inner bearing and in said race on said outer bearing ring, both annular ends of said inner bearing ring having a plurality of face splines thereon, a shaft having one end with a face having splines thereon which cooperate with the splines on one end of said inner bearing ring, said shaft having a first bore therein extending to a point adjacent one end, said shaft having a second bore therein connecting the first bore to the face having splines, a bolt having its head positioned against the abutment formed where the two bores intersect, said bolt having a threaded portion extending from said head through said second bore and from said face on said shaft, said bolt being dimensioned so that it fits within said inner bearing ring, a second shaft having one end with a face having splines thereon which cooperate with the splines on the other end of said inner bearing ring, said shaft having a hole therethrough, said hole being of such a size that the bolt projects therethrough, nut means fixedly attached to the free end of said bolt to hold said splines of said first shaft in engagement with the cooperating splines of the inner bearing ring and to hold said splines of said second shaft in engagement with the cooperating splines of the inner bearing ring.

5. In combination, a housing, said housing having an opening, an outer bearing ring mounted in said opening, an inner bearing ring mounted within said outer bearing ring, said outer bearing ring having a race on its inner periphery, a plurality of bearing elements located around said inner bearing ring and in said race on said outer bearing ring, both ends of said inner bearing ring having a plurality of face splines thereon, a shaft having a face having splines thereon which cooperate with the splines on one end of said inner bearing ring, a member extending from said face on said shaft, said member being received by said inner bearing ring, a second shaft having a face having splines thereon which cooperate with the splines on the other end of said inner bearing ring, means fixedly attached to the free end of said member to hold said splines of said first shaft in engagement with the cooperating splines of the inner bearing ring and to hold said splines of said second shaft in engagement with the cooperating splines of the inner bearing ring.

References Cited in the file of this patent

UNITED STATES PATENTS

| | | |
|---|---|---|
| 1,613,835 | Kasper | Jan. 11, 1927 |
| 1,700,800 | Keyser | Feb. 5, 1929 |
| 2,389,581 | Tarr | Nov. 20, 1945 |